United States Patent
Sanada et al.

[15] 3,675,562
[45] July 11, 1972

[54] IRIS DIAPHRAGM FOR A CAMERA

[72] Inventors: Noriaki Sanada, Tokyo; Masaharu Ito, Kawasaki, both of Japan

[73] Assignee: Canon Kabushiki Kaisha, Tokyo, Japan

[22] Filed: June 24, 1970

[21] Appl. No.: 49,459

[30] Foreign Application Priority Data

June 28, 1969 Japan..................................44/51746

[52] U.S. Cl. ..............................................95/64 R, 353/97
[51] Int. Cl. .........................................................G03b 9/06
[58] Field of Search.................95/64 R, 65; 353/83, 86, 90, 353/93, 97; 352/85

[56] References Cited

UNITED STATES PATENTS

| 2,316,694 | 4/1943 | Jarboe | 95/65 X |
| 363,961 | 5/1887 | Kuhn | 95/65 |

FOREIGN PATENTS OR APPLICATIONS

| 611,183 | 3/1935 | Germany | 95/64 |
| 725,366 | 9/1942 | Germany | 95/64 |
| 119,828 | 10/1955 | Germany | 95/64 |

*Primary Examiner*—Joseph F. Peters, Jr.
*Attorney*—McGlew and Toren

[57] ABSTRACT

An iris diaphragm for a camera which is characterized in forming at least a part of one side of each diaphragm blade constituting a diaphragm aperture in a nonlinear, concavo-convex shape so that the generation of glare is reduced.

8 Claims, 3 Drawing Figures

INVENTOR
NORIAKI SANADA
BY MASAHARU ITO

ATTORNEYS

IRIS DIAPHRAGM FOR A CAMERA

The present invention relates to an iris diaphragm for a camera.

One of the objects of the present invention is to reduce the generation of glare appearing in a picture, that is in a film surface in case the diaphragm aperture in an iris diaphragm for a camera is small.

An example of the present invention shall be explained referring to the drawings.

Figure 1:
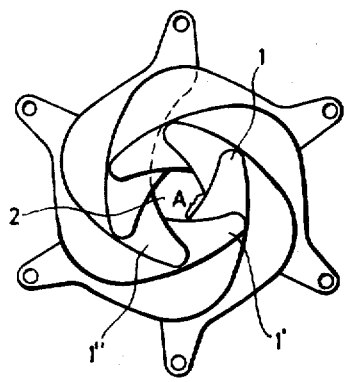
FIG. 1 is a schematic drawing of a conventional iris diaphragm for a camera.
Figure 2:
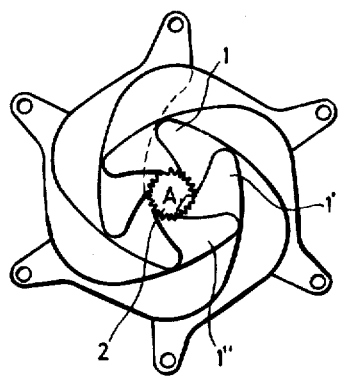
FIG. 2 is a schematic drawing of an iris diaphragm for a camera according to the present invention.
Figure 3:
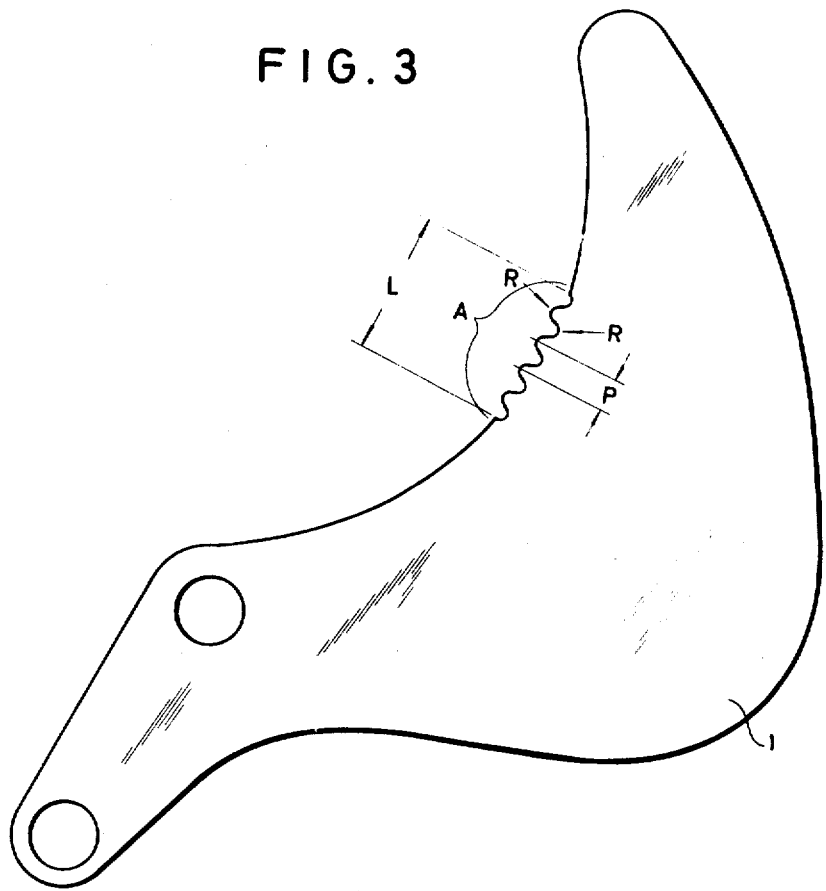
FIG. 3 is a detailed schematic drawing of a main part of the iris diaphragm according to the present invention.

FIG. 1 is a schematic drawing of a conventional iris diaphragm of a camera, wherein 1, 1' . . . are diaphragm blades, 2 shows the diaphragm aperture which is formed by a group of said diaphragm blades 1, 1' . . . . Generally speaking, when a bright spot is photographed through a lens, a glare of radial shape appears according to the shape of the diaphragm aperture 2. This is regarded as a diffraction phenomenon by the diaphragm blades 1, 1', 1" . . . which form the diaphragm aperture. Especially in night time photographing, there are many cases wherein a light source is taken in a picture (film surface), and when the light source appear in many numbers and with great intensity a very unsightly impression is given to those viewing the picture, and is not desirous as the effect of picture is spoiled, except in a special case. This phenomenon appears remarkably especially as the diaphragm aperture becomes smaller. When conventionally known iris diaphragm blades are provided to function and a relatively small diaphragm aperture is formed, each portion of the diaphragm aperture 2 forms almost a straight line, thus the above mentioned glare is apt to be generated.

Therefore, in the present invention, the side portions of diaphragm blades 1, 1', 1" . . . which form the diaphragm aperture 2 are, for its entire length or for such a portion as appearing when a relatively small diaphragm aperture 2 is formed, so composed as forming nonlinear, concavo-convex of a wavy saw-blade shape or of a special shape.

At the same time it is naturally necessary to appropriately define each dimension of the nonlinear concavo-convex portion A so that the diaphragm aperture 2 will provide an equivalent area to insure that the amount of light passing through the diaphragm aperture 2 does not vary as a result of forming the side portions of diaphragm blades 1, 1', 1" . . . into nonlinear concavo-convex shape. For instance, when it is formed in a wavy shape, of a pitch P, of a radius R of the curvature, and of a length L of the nonlinear concavo-convex portion, the dimensions of the pitch P, the radius R and the length L must be determined so as not to vary the amount of light.

As the iris diaphragm of the present invention is formed as explained above the profile of the diaphragm aperture 2 is blurred, and as a result the radiant glare will be reduced. Therefore even when a light source is taken in a film at a night time photographing, a good impression is provided and a good picture effect is secured.

What is claimed is:

1. A light diaphragm, comprising a plurality of overlapping blades, said blades each having an aperture-forming edge and being arranged to form an aperture with the edges, said blades being movable for varying the portion of the edges that form the aperture and for varying the size of the aperture, said blades each defining at the edge a plurality of cyclical undulations which have extremeties, the extremeties of at least a plurality of said undulations on each blade projecting into the aperture formed by the blades.

2. A diaphragm as in claim 1, wherein said blades are pivotally mounted for movement.

3. A diaphragm as in claim 1, wherein said blades are sickle shaped and the edges having said undulations are on the interior of the sickle shape.

4. A diaphragm as in claim 3, wherein said blades are pivotally mounted for movement.

5. A diaphragm as in claim 1, wherein said undulations extend over only a portion of the edges.

6. A diaphragm as in claim 5, wherein said blades are sickle shaped and the edges are on the interior of the sickle shape.

7. A diaphragm as in claim 5, wherein said blades are movable to vary the aperture from a size smaller than a given size to a size larger than the given size and wherein the edges outside the undulations are substantially continuous, said blades exposing only the undulations in the aperture when the aperture is less than the given size and exposing the undulations and the continuous portion of the edges when the aperture is larger than the given size.

8. A diaphragm as in claim 1, wherein said edges include a portion having the undulations and a continuous portion, the continuous portion extending substantially along the average values of the undulations.

* * * * *